UNITED STATES PATENT OFFICE.

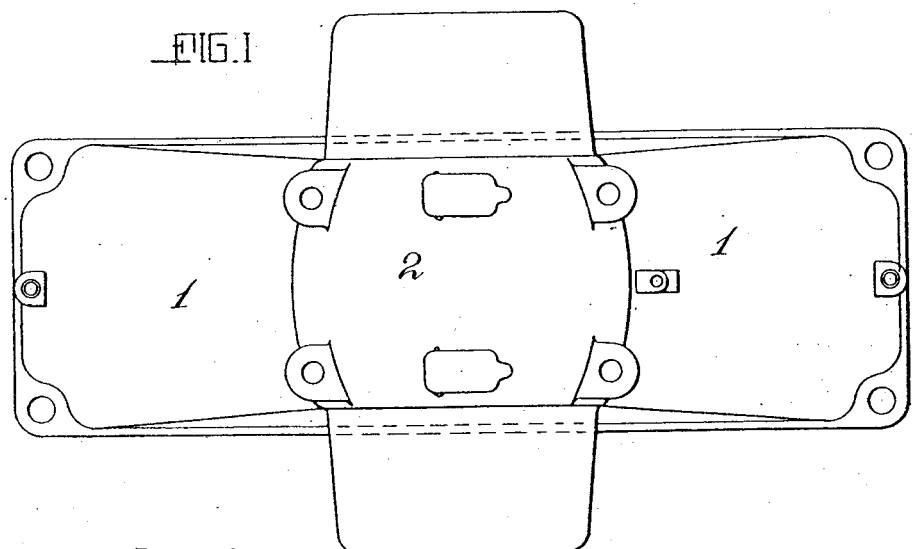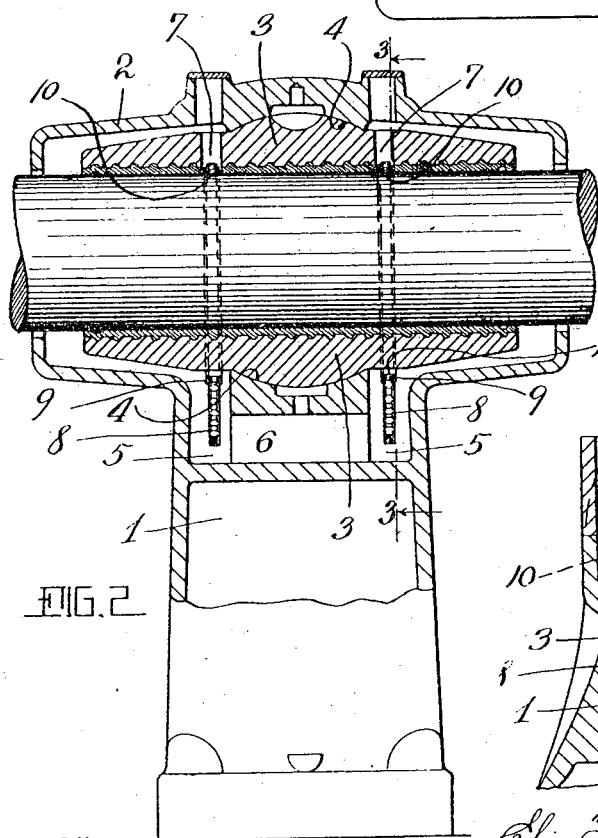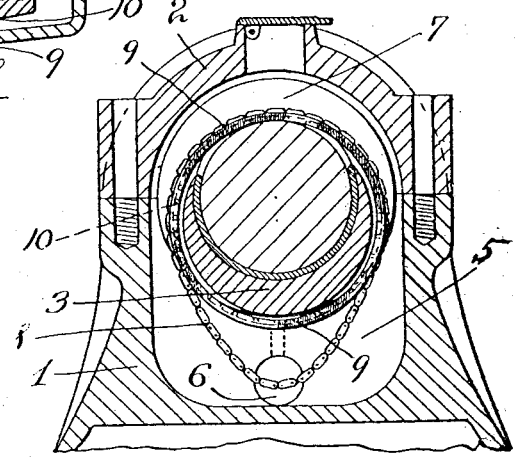

ELIE F. G. H. FAURE, OF ERIE, PENNSYLVANIA, ASSIGNOR TO BURKE ELECTRIC COMPANY, A CORPORATION OF PENNSYLVANIA.

SELF-OILING BEARING.

1,119,815. Specification of Letters Patent. Patented Dec. 8, 1914.

Application filed September 18, 1907. Serial No. 393,441.

*To all whom it may concern:*

Be it known that I, ELIE F. G. H. FAURE, citizen of the French Republic, residing at Erie, in the county of Erie and State of Pennsylvania, have invented certain new and useful Improvements in Self-Oiling Bearings, of which the following is a full, clear, and exact specification.

My invention relates to self oiling bearings, and although the use thereof is well adapted for dynamo electric machines, it is of advantage in bearings generally.

Among the objects of my invention may be stated the provision of means for efficiently oiling the bearing, and securing a uniform supply of oil and reliability in operation.

A further object is to provide oiling means which may be simply constructed, and which will occupy only a comparatively small amount of space and so reduce the size of the journal box.

It has been customary to use bearings in which the bearing sleeve is slotted in the upper portion at one or more points, and in each slot of which is located a ring which engages the upper portion of the shaft and which is of sufficient diameter to have its lower portion pass through an oil reservoir below the shaft. The rotation of the shaft causes the ring to rotate and carry oil on its surface from the reservoir to the upper portion of the bearing. The oil then flows in between the bearing surfaces. One objection to this construction is the necessity for making the ring of large diameter in order that it may extend well below the shaft into a considerable quantity of oil. This ring having a considerably larger diameter than the shaft, requires a journal box which is much wider than would otherwise be necessary. By my invention this large width of bearing is avoided. Also in the above mentioned type of ring oiling device, the oil supplied to the bearing is merely that which covers the surface of the ring, but by use of my invention the amount of oil supplied is greatly increased. Also in the construction formerly used, the ring is likely to stop in its movement and ceases to supply oil by reason of its light weight and poor frictional contact with the upper portion of the shaft. By my invention this is overcome, and an efficient and reliable oiling device produced. These and other features of my invention will be understood from the accompanying drawings, and description thereof.

Figure 1 is a plan view of a bearing embodying my invention; Fig. 2 is a longitudinal sectional view of the bearing taken in a vertical plane, and Fig. 3 is a sectional view on line 3—3, of Fig. 2.

The bearing is shown as having a pedestal 1 which supports the lower portion of the journal box, the upper half 2 forming the removable cap. Within the journal box is a bearing sleeve 3 having a spherical bearing surface 4 which engages a similar surface in the journal box, thus forming a bearing of the self alining type. In the lower half of the journal box is formed an oil reservoir, the parts 5, 5 of which are connected by an opening 6 shown in Fig. 2. The upper portion of the bearing sleeve is shown slotted circumferentially at 7, 7, and in each of these slots and encircling the shaft and portion of the bearing sleeve is a chain 8 of suitable form. I have shown a bicycle chain in the drawings and have found this to produce good results in practice. The chain hangs as shown in Fig. 3, its lower portion extending into the part 5 of the reservoir. Between the chain and the shaft is located a small sized ring 9 having a recessed outer rim for receiving the chain and having a series of holes 10 at intervals throughout the circumference of the ring. The ring does not extend into the oil reservoir but serves as a carrier for the chain.

In operation, the rotation of the shaft serves to move the chain through the medium of the ring 9. The oil gathers on the chain over the surface of the links and between the links and results in carrying a much larger quantity of oil to the bearing than in the case of merely using a ring. When the coated portion of the chain passes within the slot 7, the oil will flow from the chain and ring onto the bearing surfaces. Any tendency of the oiling means to stop in its rotation is overcome by reason of the weight of the chain on the ring which gives good frictional contact between the ring and shaft.

It will be seen that the width of the oiling means is very much less than when the old type of oil ring is used, and the width of the journal box is correspondingly reduced. Also the cost of manufacture is less by the use of my invention by reason of its compactness and in avoiding the cost of making the large brass rings formerly used. Another advantage of my invention is that the rate of movement of the chain is substantially constant. The chain passing through the oil places a drag upon the device and so prevents an unduly high speed or sudden change in speed and thus overcomes splashing of the oil. The carrier for the chain is important in that the cut-away portion of the sleeve is slight compared with a construction where a chain with no carrier is used. With the chain alone, the sleeve must be cut away so that the chain will hang freely and not rub against the sleeve, as otherwise the friction between the chain and sleeve causes the movement of the chain to be irregular or stop entirely, and also causes most of the oil to be wiped off the chain before reaching the shaft. The cutting away of the sleeve is therefore necessary and this so weakens the shaft as to render such a construction impracticable or dangerous. By using the carrier the strength of the sleeve is not only maintained, but the bearing surface between the shaft and sleeve within the carrier is maintained comparatively large and extends over a large cylindrical surface, thus providing ample surface for the oil to be carried between the shaft and bearing and thence spread over all the bearing surface.

It will be understood that my invention may be subject to various modifications in form without departing from the scope thereof. Any desired number of slots and chains may be used in a bearing, and the form of the chain or similar device and carrier, as well as the form or type of bearing used may differ from the particular form shown in the drawings.

Having thus described my invention, I declare that what I claim as new and desire to secure by Letters Patent, is:

1. The combination with a shaft, of a journal box therefor comprising a bearing sleeve and an oil reservoir, a linked element for conveying oil to the surfaces of said bearing sleeve, and a carrier for said linked element, the upper portion of said bearing sleeve being slotted to receive said carrier, said carrier being in frictional contact with the upper portion of said shaft and surrounding the lower portion of said bearing sleeve.

2. In a self-oiling bearing, in combination with a shaft, a journal bearing therefor, and an oil reservoir, a linked element, and an annular carrier for said element, said carrier being eccentric to said shaft and movable relative thereto.

3. The combination with a shaft, of a bearing box therefor comprising a bearing sleeve and an oil reservoir, a linked element for conveying oil to the surfaces of said bearing sleeve, and an annular carrier for said linked element, said bearing sleeve being slotted at its upper portion thereof to receive said carrier, said carrier being in frictional contact with an upper portion of said shaft and encircling the lower portion of said bearing sleeve.

4. In a self-oiling bearing, the combination of a shaft, a journal bearing having a slotted upper portion, an oil reservoir, a linked element for conducting oil from said reservoir to said bearing, and an annular carrier for said linked element, said carrier being disposed in said slotted portion and having a width greatly less than the width of said bearing, said carrier being eccentric with respect to said shaft and movably supported by said shaft at an upper portion thereof.

5. In a self-oiling bearing, the combination of a shaft, a journal bearing, a linked element, an oil reservoir, and a perforated annular carrier for said element, said carrier being of greater internal diameter than said shaft and disposed eccentric to said shaft and movably mounted thereon.

6. In a self-oiling bearing the combination of a shaft, a bearing therefor, an oil reservoir, means for conveying oil from said reservoir to said shaft, and an annular carrier for said oil conveying means, said carrier being eccentric to said shaft and movable relative thereto.

7. In a self-oiling bearing, the combination of a shaft, a bearing therefor, an oil reservoir, means for conveying oil from said reservoir to said shaft, and a perforated annular carrier for said oil conveying means, said carrier being of greater internal diameter than said shaft disposed eccentric to and movable relative to said shaft.

In testimony whereof I affix my signature, in presence of two witnesses.

ELIE F. G. H. FAURE.

Witnesses:
GEO. H. WINKLER, Jr.,
CHAS. H. SCHUM.